3,387,002
PROCESS FOR PREPARING 5-(AMINOALKYL)-5,11-DIHYDRODIBENZOXAZEPINES AND DIHYDRODIBENZOTHIAZEPINES
Harry L. Yale, New Brunswick, and Albert R. Restivo, Belleville, N.J., assignors to E. R. Squibb & Sons, Inc., New York, N.Y., a corporation of Delaware
No Drawing. Continuation-in-part of application Ser. No. 437,560, Mar. 5, 1965. This application Sept. 17, 1965, Ser. No. 488,266
10 Claims. (Cl. 260—327)

ABSTRACT OF THE DISCLOSURE

5 - (aminoalkyl) - 5,11 - dihydrodibenzoxazepines and 5 - (aminoalkyl) - 5,11 - dihydrodibenzothiazepines are prepared by reacting 5,11 - dihydrodibenzoxazepines or 5,11 - dihydrodibenzothiazepines with an aminoalkyl halide in the presence of either an excess of sodium hydroxide in acetone or an excess of sodium hydride in dry tetrahydrofuran.

---

This application is a continuation-in-part of our application, Ser. No. 437,560, filed Mar. 5, 1965, and now abandoned.

This invention relates to new and improved processes for preparing 5 - (aminoalkyl) - 5,11 - dihydrodibenzoxazepines and 5 - (aminoalkyl) - 5,11 - dihydrodibenzothiazepines.

Prior to this invention it was known that 5 - (aminoalkyl) - 5,11 - dihydrodibenzoxazepines and 5 - (aminoalkyl) - 5,11 - dihydrodibenzothiazepines are useful compounds having physiological activity. In U.S. Patents Nos. 3,069,432 and 3,188,322, granted to Yale et al., these compounds are disclosed and their method of preparation by reacting a compound of the Formula I:

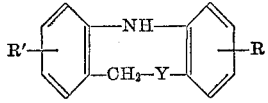

(I)

with an aminoalkyl halide of the Formula II:

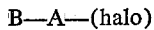

B—A—(halo)

(II)

to yield the final products of the Formula III:

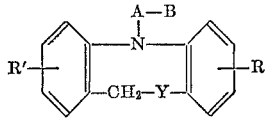

(III)

wherein the halo is preferably chloro, A is a lower alkylene radical of at least two carbon atoms, B is a basic saturated nitrogen-containing radical of less than twelve carbon atoms, Y is oxy (—O—) or thio (—S—), and R and R' are the same or different and represent hydrogen, halogen, lower alkyl, lower alkoxy, trifluoromethyl, trifluoromethylmercapto, trifluoromethoxy or N,N-dimethylaminosulfonyl is also disclosed. In said patents it is also stated that this reaction should be conducted in the presence of a basic condensation reagent such as sodium hydride.

It has now been found that if the reaction is carried out using either: (a) powdered sodium hydroxide, in excess of the stoichiometric amount, in an acetone solvent, or (b) sodium hydride, in excess of the stoichiometric amount in dry tetrahydrofuran, the yield of desired product is greatly increased and is reproducible over that obtained by the procedure of said patents. Although any excess of powdered sodium hydroxide can be used, preferably at least about 4 molar equivalents, and optimally about 6 to about 8 molar equivalents, of powdered sodium hydroxide is used per mole of the compound of Formula I present in the reaction mixture. Similarly, although any excess of sodium hydride can be used, preferably at least 1.2 molar equivalents, and optimally about 1.4 molar equivalents, of sodium hydride is used per mole of the compound of Formula I present in the reaction mixture. Although stoichiometric amounts of reactants of the Formulae I and II may be used, to insure complete reaction the amine of Formula II is preferably present in excess.

The reaction can be conducted under any normal temperature, such as ambient temperature, but to increase the speed of reaction, the reaction is preferably carried out at an elevated temperature, such as the reflux temperature of the reaction mixture.

The following examples illustrate the invention (all temperatures being in centigrade):

Example 1.—Preparation of 5-(2-dimethylaminoethyl)-5,11-dihydrodibenz[b,e][1,4]oxazepine maleate A mixture of 10 g. of 5,11-dihydrodibenz[b,e][1,4]oxazepine, 24 ml. of 2-dimethylaminoethyl chloride and 16 g. of powdered sodium hydroxide in 100 ml. of acetone is refluxed for two hours. The mixture is cooled and filtered and the filtrate is concentrated to dryness. The residue is dissolved in ether and the solution is extracted with dilute hydrochloric acid. The acid phase is made alkaline with sodium hydroxide solution and extracted with ether. Following concentration of the ether solution, the residue is dissolved in acetone and an acetone solution of maleic acid is added. Ether is added to crystallize the product, 5 - (2 - dimethylaminoethyl) - 5,11 - dihydrodibenz[b,e][1,4]oxazepine maleate in 72% yield, M.P. about 141–142°.

By way of contrast if tetrahydrofuran is substituted for the acetone in the above example the yield is reduced to 39%.

Example 2.—Preparation of 5 - (2 - dimethylaminoethyl) - 5,11 - dihydro-7-(trifluoromethyl)dibenz[b,e][1,4]oxazepine maleate A mixture of 5 g. of 5,11-dihydro-7-(trifluoromethyl)-dibenz[b,f][1,4]oxazepine, 8.2 g. of 2-dimethylaminoethyl chloride, and 6 g. of powdered sodium hydroxide in 50 ml. of acetone is reacted as in Example 1 to give a 64% yield of 5 - (2 - dimethylaminoethyl)-5,11-dihydro-7 - (trifluoromethyl)dibenz[b,e][1,4]oxazepine maleate, M.P. about 166–168°.

Example 3.—Preparation of 5-(2-diethylaminoethyl)-5,11 - dihydro - 7 - (trifluoromethyl)dibenze[b,e][1,4]oxazepine maleate A mixture of 7.3 g. of 5,11-dihydro-7-(trifluoromethyl)-dibenz[b,e][1,4]oxazepine, 15.0 g. of 2-diethylaminoethyl chloride and 8.8 g. of powdered sodium hydroxide in 73 ml. of acetone is reacted as in Example 1 to give an 80% yield of 5-(2-diethylaminoethyl)-5,11-dihydro-7-(trifluoromethyl)dibenz[b,e][1,4]oxazepine, B.P. about 152–157° (0.2 mm.). This base gives a maleate, M.P. about 147–149°.

Example 4.—Preparation of 5-(2-dimethylaminoethyl)-5, 11-dihydrodibenz[b,e][1,4]oxazepine maleate To a solution of 10 g. of 5,11-dihydrodibenz[b,e][1,4] oxazepine in 100 ml. of dry tetrahydrofuran, under nitrogen, is added 24 ml. of 2-dimethylaminoethyl chloride followed by 3.4 g. of 50% dispersion of sodium hydride in mineral oil. The mixture is refluxed for four hours, cooled, and filtered. The filtrate is concentrated to dryness and the residue dissolved in ether. The ether solution is then treated as in Example 1 to give the product, 5-(2-dimethylaminoethyl) - 5,11 - dihydrodibenz[b,e][1,4]oxazepine maleate in 80% yield.

By way of contrast, if benzene or toluene is used in place of the tetrahydrofuran in the above example, no product is formed; and, if the procedure of Example 12 of U.S. Patent No. 3,069,432, employing xylene, is used, the yield is 28%.

Example 5.—Preparation of 5-(2-dimethylaminoethyl)-5, 11-dihydrodibenzo[b,e][1,4]thiazepine maleate A mixture of 17.8 g. of 5,11-dihydrodibenzo[b,e][1,4]thiazepine, 165 ml. of acetone, 38.5 ml. of 2-dimethylaminoethyl chloride, and 20.0 g. of powdered sodium hydroxide is stirred and heated under reflux for three hours. The acetone solution is decanted, the insoluble material is washed repeatedly with fresh acetone, and the combined acetone extracts are concentrated to dryness. The residue is dissolved in 125 ml. of benzene, extracted with 2-100 ml. portions of ice cold 5% aqueous hydrochloric acid, and the cold acid extracts treated with an excess of 40% aqueous potassium hydroxide. The liberated oil is extracted into ether, the ether extracts are washed with saturated aqueous sodium chloride, dried, and concentrated. Distillation of the residue gives 5-(2-dimethylaminoethyl) - 5,11 - dihydrodibenzo[b,e][1,4]thiazepine, B.P. about 180° (0.1 mm.).

To the distilled base obtained above in 67 ml. of acetone is added a boiling solution of 11.7 g. of maleic in 50 ml. of acetone. On cooling, a crystalline product separates and is filtered and recrystallized from 2-propanol to give about 15.4 g. of 5-(2-dimethylaminoethyl)-5,11-dihydrodibenzo[b,e][1,4]thiazepine maleate, M.P. about 154–155°.

The invention may be variously embodied within the scope of the appended claims.

What is claimed is:

1. A process for preparing 5-(aminoalkyl)-5,11-dihydrodibenz[b,e][1,4]oxazepines which comprises interacting an aminoalkyl halide with a 5,11-dihydrobenz[b,e][1,4]oxazepine in the presence of a condensation system selected from the group consisting of an excess of sodium hydroxide in acetone and an excess of sodium hydride in tetrahydrofuran.

2. The process of claim 1, wherein the second reactant is of the formula

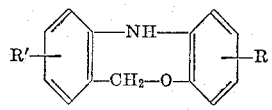

wherein R and R' are each selected from the group consisting of hydrogen, halogen, lower alkyl, lower alkoxy, trifluoromethyl, trifluoromethylmercapto, trifluoromethoxy and N,N-dimethylaminosulfonyl.

3. The process of claim 1 wherein the aminoalkyl halide is di(lower alkyl)amino(lower alkyl) chloride.

4. The process of claim 1 wherein the reactant is 5,11-dihydrodibenz[b,e][1,4]oxazepine.

5. The process of claim 4 wherein the aminoalkyl halide is 2-dimethylaminoethyl chloride.

6. The process of claim 4 wherein the aminoalkyl halide is 2-diethylaminoethyl chloride.

7. The process of claim 9 wherein the reactant is 5,11-dihydrodibenzo[b,e][1,4]thiazepine.

8. The process of claim 7 wherein the aminoalkyl halide is 2-dimethylaminoethyl chloride.

9. A process for preparing 5-(aminoalkyl)-5,11-dihydrodibenz[b,e][1,4] thiazepines which comprises interacting an aminoalkyl halide with a 5,11-dihydrodibenz[b,e][1,4] thiazepine in the presence of a condensation system containing an excess of sodium hydroxide in acetone.

10. The process of claim 9, wherein the second reactant is of the formula

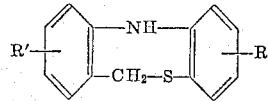

wherein R and R' are each selected from the group consisting of hydrogen, halogen, lower alkyl, lower alkoxy, trifluoromethyl, trifluoromethylmercapto, trifluoromethoxy and N,N-dimethylaminosulfonyl.

References Cited

UNITED STATES PATENTS 3,188,322   6/1965   Yale et al. _____ 260—327

JAMES A. PATTEN, *Primary Examiner.*